H. THORNE.
ANTISKID DEVICE FOR AUTOMOBILES, &c.
APPLICATION FILED NOV. 18, 1916.

1,236,499.

Patented Aug. 14, 1917.
3 SHEETS—SHEET 1.

WITNESSES:
Isaac W Jacobson
George Schoeck

INVENTOR.
Harold Thorne
BY Geo. Wm Meatt
ATTORNEY.

H. THORNE.
ANTISKID DEVICE FOR AUTOMOBILES, &c.
APPLICATION FILED NOV. 18, 1916.

1,236,499.

Patented Aug. 14, 1917.

WITNESSES:
Isaac W Jacobson
George Schoeck

INVENTOR.
Harold Thorne
BY Geo. Wm Miatt
ATTORNEY.

UNITED STATES PATENT OFFICE.

HAROLD THORNE, OF NEW YORK, N. Y., ASSIGNOR, BY MESNE ASSIGNMENTS, TO WILLIAM H. PUTNAM, OF BROOKLYN, NEW YORK.

ANTISKID DEVICE FOR AUTOMOBILES, &c.

1,236,499.  Specification of Letters Patent.  Patented Aug. 14, 1917.

Application filed November 18, 1916. Serial No. 131,986.

*To all whom it may concern:*

Be it known that I, HAROLD THORNE, a subject of the King of Great Britain, and a resident of the borough of Manhattan, city, county, and State of New York, have invented certain new and useful Improvements in Antiskid Devices for Automobiles, &c., of which the following is a specification.

My invention relates to means for preventing the lateral slipping or "skidding" of wheels, particularly those used on automobiles,—the object being to afford a simple but effective substitute for the anti-skid chains ordinarily used for the purpose, the application of which involves the expenditure of considerable time and labor under conditions that are not ordinarily agreeable, convenient, nor cleanly.

The invention consists essentially in the use of flexible frictional deterrent means which, when necessary, may be interposed by centrifugal force between the tread of a wheel and the surface with which it contacts, thereby increasing attritive resistance and counteracting any tendency of the wheel to yield transversely to its plane of rotation, all as hereinafter fully set forth.

In the accompanying drawings.

Figure 1:
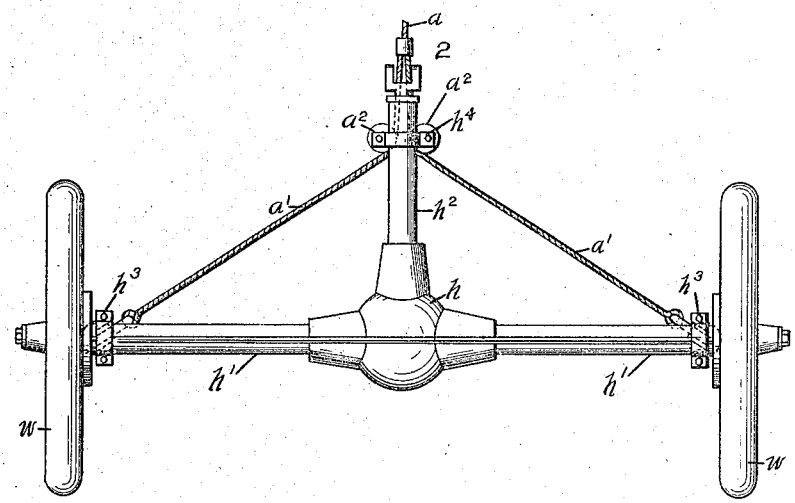
Figure 1, is a plan of the rear wheels of an automobile showing the housing for the rear shaft, etc., and one means for actuating and controlling my anti-skid device.
Figure 2:
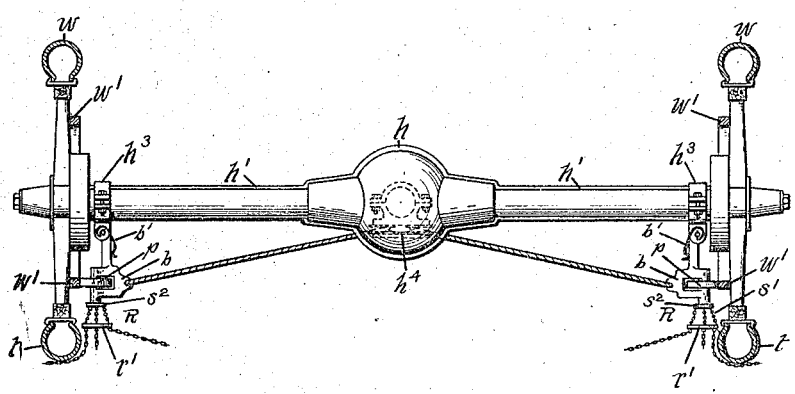
Fig. 2, is a sectional elevation of the parts shown in Fig. 1, viewed from the rear.

While applicable to vehicle wheels of various kinds my anti-skid device is especially designed for use in connection with the rear wheels $w$, $w$, of automobiles, and is herein shown and described employed in conjunction therewith, the device and connections being represented as mounted and supported on the rear shaft housing consisting of the differential casing $h$, shaft sleeves $h'$, $h'$, and power shaft sleeve $h^2$.

The device may be applied to either one or both rear wheels of the vehicle, preferably to both,—in which case the parts are duplicated but reversed in position at the opposed inner sides of said rear wheels.

The purpose of the rotatable member R, considered as a whole, is to articularly support and actuate one or more frictional deterrents $r$, preferably a plural number thereof. In the accompanying drawings these frictional deterrents $r$, $r$, are represented as consisting each of a suitable length of metallic chain, which on account of its strength, flexibility and coarse and rugged character, is especially suited for the purpose, although I do not confine myself to the use of such material in the formation of said frictional deterrents since various equivalents and mechanical expedients and various materials may be substituted with like result,—the essential feature in this respect being a suitable length of appropriate material articularly connected at one end to the rotor $r'$, in such manner as to be free to conform to centrifugal force. In the drawings only three such frictional deterrents $r$, $r$, $r$, are shown as so attached to each rotor $r'$, for clearness of illustration, although in practice five or six may be connected with each rotor $r'$, to advantage.

Figure 3:
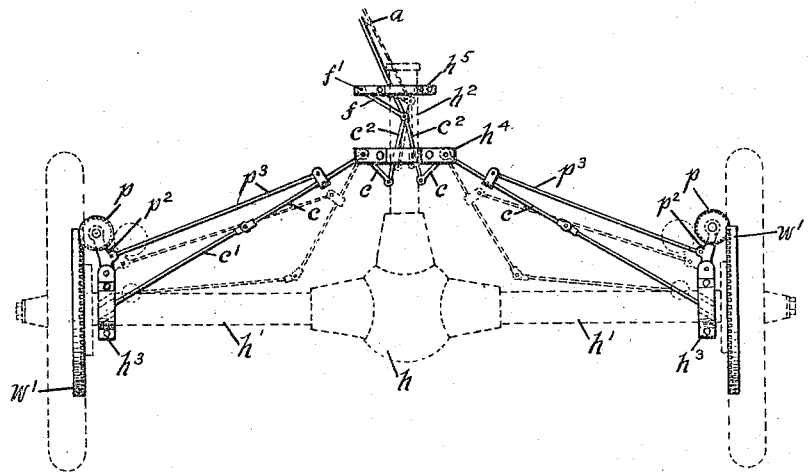
Fig. 3, is a view similar to Fig. 1, with parts dotted in to more clearly show an alternative means for actuating and controlling my anti-skid device.
Figure 4:
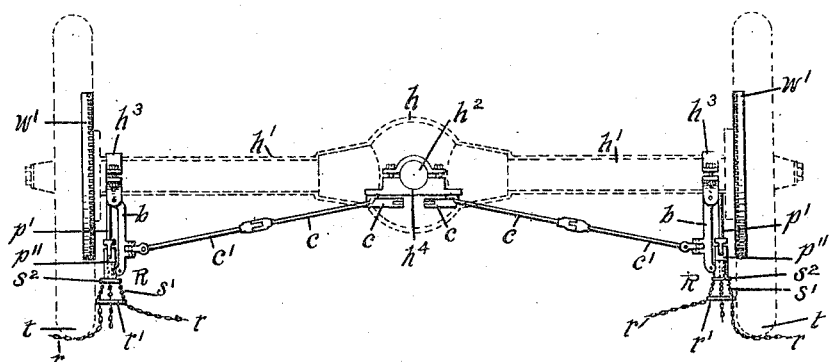
Fig. 4, is a rear elevation of the operative parts shown in Fig. 3, the worm gear pinion being omitted.
Figure 5:
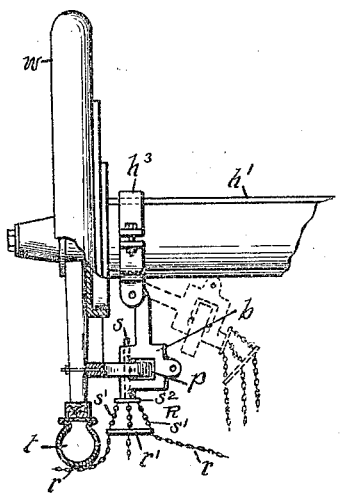
Fig. 5, is a sectional elevation showing in detail the method of supporting and actuating my anti-skid device in the manner indicated in Figs. 1, 2, and 7.
Figure 6:
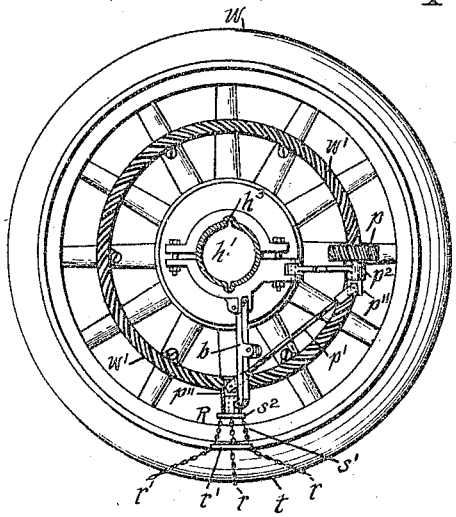
Fig. 6, is an elevation of the inner side of a rear wheel showing in detail the method of supporting and actuating my anti-skid device as illustrated in Figs. 3, and 4.
Figure 8:
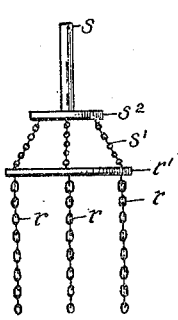
Fig. 8, is an enlarged detail of the rotor and connection.
Figure 7:
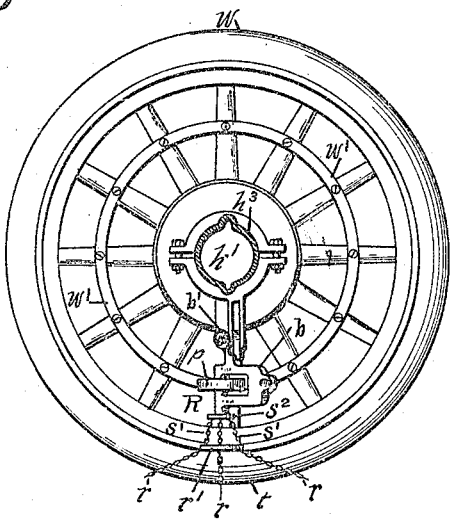
Fig. 7, is a view similar to Fig. 6, showing in further detail the method of supporting and actuating my anti-skid device in the manner indicated in Figs. 1, 2, and 5.

The rotor $r'$, is attached to a spindle $s$, preferably by flexible connections $s'$, $s'$, interposed between it and the flange $s^2$, on the lower end of said spindle $s$. The spindle $s$, is mounted on a suspender bracket $b$, pivotally attached to a strap $h^3$, on the axle sleeve $h'$. Attached to the spindle $s$, is a driving pinion $p$, by means of which motion is derived from the wheel $w$, to rotate the spindle $s$, and rotor $r'$. When the suspender bracket $b$, is lowered to bring the driving pinion $p$, into operative position the latter contacts with an annular drive member $w'$, rigidly secured concentrically upon the wheel $w$. This annular concentric drive member $w'$, of the wheel may be formed with a plain contactual surface as in Figs. 1, 2, 5, and 7, in which case the driving pinion $p$, consists of a peripherally plain friction wheel; or said annular concentric drive member $w'$, may consist of a gear, preferably of the worm tooth type, as in Figs. 3, 4, and 6,—the driving pinion $p$, being formed with corresponding peripheral worm teeth, as shown more particularly in Fig. 6. In the latter case the driving pinion $p$, is connected with the spindle $s$, of the rotatable member R, by means of a flexible shaft $p'$, and universal joint couplings $p''$, and the pinion $p$, is mounted on an arm $p^2$, pivoted to the lower members of the strap $h^3$, said arm $p^2$, being pivotally connected by a rod $p^3$, with the long arm of the bell-crank lever $c$, which latter is pivotally supported on the under side of the fulcrum block $h^4$, which is strapped rigidly to the shaft sleeve $h^2$. The long arm of the bell-crank lever $c$, is also pivotally connected by a rod $c'$, and articular joints, with the suspender bracket $b$; and the short arm of said bell-crank lever $c$, is pivotally connected by a rod $c^2$, with the fulcrum link $f$, which is pivoted at $f'$, to the strap $h^5$, rigidly secured to the shaft sleeve $h^2$. The fulcrum link $f$, is controlled by a connection $a$, extending to a pedal, lever or other manipulatory device situated in convenient proximity to the chauffeur. By this means the gear pinion $p$, shown in Figs. 3, 4, and 6, may be positively connected with and disconnected from the worm gear $w'$, shown in said figures of the drawings, the positions of the several parts in the positive connection being shown in solid lines in Fig. 3, while the position of the same parts effecting disconnection between pinion $p$, and gear $w'$, is indicated in said Fig. 3, by means of dotted lines.

Where frictional contact between the pinion $p$, and the annular drive member $w'$, on the wheel $w$, in Figs. 1, 2, 5, and 7, is relied upon to operate the rotor $r'$, the pinion $p$, is held out of connection with said drive member $w'$, against the resistance of the spring $b'$, by a flexible connection $a'$, attached at one end to the suspender bracket $b$, and extending over a guide pulley $a^2$, on the strap $h^4$ to the control $a$, to which it is attached as shown particularly in Fig. 1. The spring $b'$, tends constantly to thrust and hold pinion $p$, into peripheral contact with annular drive member $w'$.

I thus illustrate alternative methods of actuating my rotatable anti-skid device R, by motion derived directly from the wheel in conjunction with which it is to operate, although it is obvious that other means of rotation may be provided, or motion borrowed from other operative parts of the machine with like result, the main essential in this respect being that of imparting to the rotor $r'$, a force and speed sufficient to effect the spreading radially and tangentially by centrifugal force of the deterrents $r$, $r$, in such manner as to project them successively into the path of the tread $t$, of the wheel $w$, to increase frictional resistance between the latter and the surface over which it is traveling, and thereby counteract any tendency to lateral slip of the tread. The speed imparted to the rotor $r'$, is sufficient to feed the frictional deterrents $r$, $r$, in proper proportion to the peripheral speed of the wheel; and when the latter slows up and stops under the application of the brake or otherwise, the flexible suspenders $s'$, $s'$, will allow the momentum acquired by the rotor $r'$, to carry said deterrents $r$, $r$, to the fore, piling them up under or in contact with the tread $t$.

My anti-skid device when not desired for actual use is easily retracted and held out of operative relationship to the wheel for which it is provided, while it may be quickly positioned operatively with relation thereto whenever desirable.

Thus it is not necessary as in the case of ordinary anti-skid chains to stop the car in order to apply them to the wheel treads, as my deterrents $r$, $r$, whether chains or the equivalents thereof, are always ready for instant use, and can be advanced or retracted by a simple manipulation of the control $a$, by the chauffeur. The amount of time and labor thus saved is obvious when it is considered that it takes fifteen or twenty minutes to apply the ordinary anti-skid chains to the rear wheels of an auto; that they are usually applied under disagreeable conditions of road and weather; that the chauffeur has to leave his car for the purpose; that the chains have to be taken from a place of storage, dragged to the rear wheels, and cannot be applied thereto without the exercise of considerable force and patience; and that the operation of removal is just about as arduous and protracted as that of application. Furthermore in renewing a worn out chain in my device only one connection is involved, whereas in renewing a section in the ordinary form of wheel chain two connections have to be attended to.

Another important function of my device is its availability for immediate use on occasion to brush or knock out of the path of the wheel tread objects that might injure said tread, such as broken glass, stones, tacks, nails, etc.,—the centrifugal force imparted to the deterrents $r$, $r$, enabling them to deflect such objects from in front of the advancing tread and out of danger of contact therewith.

What I claim as my invention and desire to secure by Letters Patent is,

1. An anti-skid device of the character designated, comprising a flexibly suspended rotatable member supported in juxtaposition to the rim of a vehicle wheel and a frictional deterrent flexibly connected with said rotatable member and adapted to be interposed by centrifugal force between the tread of said wheel and the surface with which it contacts, in combination with said vehicle wheel, and with means for actuating said rotatable member.

2. An anti-skid device of the character designated, comprising a flexibly suspended rotatable member retractably supported in justaposition to the rim of a vehicle wheel, and a plurality of flexible frictional deterrents articularly connected with said rotatable member and adapted to be interposed successively by centrifugal force between the tread of said wheel and the surface with which it contacts, in combination with said vehicle wheel, with means for actuating said rotatable member, and with means for retracting the latter from its operative position.

3. An anti-skid device of the character designated, comprising a flexibly suspended rotatable member supported in juxtaposition to the rim of the wheel and consisting of a rotor flexibly connected with a driving spindle, and of a plurality of frictional deterrents flexibly connected with said rotor and adapted to be interposed successively by centrifugal force between the tread of said wheel and the surface with which it contacts, in combination with said vehicle wheel, and with means for actuating said rotatable member.

4. An anti-skid device of the character designated, comprising an annular drive member, a rotatable member operated therefrom, means for flexibly suspending said rotatable member and flexible frictional deterrents articularly connected with said rotatable member whereby said deterrents are given a torsional action to pile them up under or in contact with the tread of a wheel.

HAROLD THORNE.

Witnesses:
ROBT. R. HILL,
GEO. WM. MIATT.

Copies of this patent may be obtained for five cents each, by addressing the "Commissioner of Patents, Washington, D. C."